US012230151B2

(12) United States Patent
Tanaka et al.

(10) Patent No.: US 12,230,151 B2
(45) Date of Patent: Feb. 18, 2025

(54) FLIGHT ROUTE GENERATION DEVICE AND FLIGHT ROUTE GENERATION METHOD

(71) Applicant: KDDI CORPORATION, Tokyo (JP)

(72) Inventors: Takaya Tanaka, Tokyo (JP); Sou Yamazaki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 219 days.

(21) Appl. No.: 17/411,756

(22) Filed: Aug. 25, 2021

(65) Prior Publication Data

US 2022/0238024 A1 Jul. 28, 2022

(30) Foreign Application Priority Data

Jan. 26, 2021 (JP) ................................. 2021-010637

(51) Int. Cl.
*G08G 5/00* (2006.01)

(52) U.S. Cl.
CPC ............. *G08G 5/006* (2013.01); *G08G 5/003* (2013.01); *G08G 5/0069* (2013.01)

(58) Field of Classification Search
CPC ...... G08G 5/006; G08G 5/003; G08G 5/0069; G08G 5/0013; G08G 5/0026; G08G 5/0034; G01C 21/20
See application file for complete search history.

(56) References Cited

U.S. PATENT DOCUMENTS

2018/0237161 A1* 8/2018 Minnick ............... B64C 39/024
2019/0250643 A1 8/2019 Takizawa

FOREIGN PATENT DOCUMENTS

CN 109328164 A 2/2019
JP 2016-173722 A 9/2016
JP 2018-146546 A 9/2018
JP 2018169995 A * 11/2018
JP 2021-002345 A 1/2021

OTHER PUBLICATIONS

Bracken, Ryan, DroneSense Feature Webinar: Flight Planning, Jan. 21, 2021, DroneSense, https://www.youtube.com/watch?v=zblFRsqHutw&t=421s (Year: 2021).*
Japanese Office Action in Corresponding Japanese Application No. 2021-010637 dated Dec. 7, 2021, with English Translation.
Chinese Office Action in corresponding Chinese Application No. 201111005942.5, dated Sep. 29, 2024 (24 pages).

* cited by examiner

*Primary Examiner* — Aniss Chad
*Assistant Examiner* — Chase L Cooley
(74) *Attorney, Agent, or Firm* — Foley & Lardner LLP

(57) ABSTRACT

A flight route generation device is configured to generate a plurality of flight routes for a flight vehicle to fly over a plurality of working areas in a one-time flight. The flight route generation device includes an acquisition unit configured to acquire the working-area information for designating a plurality of working areas intended for a plurality of operations to be performed by a flight vehicle during its flight and the interregional information for determining a plurality of interregional flight routes along which the flight vehicle is permitted to fly over a plurality of working areas, and a generator configured to generate a plurality of intraregional flight routes for the flight vehicle to fly through the plurality of working areas based on the working-area information and a plurality of interregional flight routes based on the interregional information to prevent the flight vehicle from entering into a flight-prohibited area.

13 Claims, 10 Drawing Sheets

FLIGHT ROUTE GENERATION DEVICE AND FLIGHT ROUTE GENERATION METHOD

CROSS-REFERENCE TO RELATED APPLICATION

The present application claims the priority benefit of Japanese patent Application No. 2021-010637 filed on Jan. 26, 2021, the subject matter of which is hereby incorporated herein by reference.

BACKGROUND OF THE INVENTION

1. Field of the Invention

The present invention generally relates to a flight route generation device and a flight route generation method configured to generate a flight route (or a flight path) planned for a flight vehicle to fly along.

2. Description of Related Art

Recently, flight vehicles which are designed to fly along flight routes generated in advance have been widely spread in the world. As a method of setting a flight route, engineers have developed a technology of autonomously generating a flight route used to take aerial photos in a flight region set by a surveyor (see Patent Document 1, i.e., Japanese Patent Application Publication No. 2018-146546). Patent Document 1 discloses an information processing system designed to measure geographical positions (e.g., longitude, latitude, and altitude) of air-photo signals posted on grounds reflected in aerial photos.

The technology of Patent Document 1 allows a flight vehicle to fly over a single flight region during a one-time flight. When a user prefers a flight vehicle to fly over multiple flight regions in a one-time flight, it is possible for the user to conceive of setting a large flight area including multiple flight regions. However, the user may face a legal risk due to a flight vehicle inadvertently entering into a flight-prohibited area when any one of multiple flight regions included in a large flight area approaches is close to an airspace prohibiting any objects to fly therethrough such as third-party's premises.

The present invention is made in consideration of the aforementioned circumstances, and therefore the present invention aims to provide a flight route generation device and a flight route generation method configured to prevent a flight vehicle from entering into a flight-prohibited area and to generate a flight route allowing a flight vehicle to fly over multiple flight regions in a one-time flight.

SUMMARY OF THE INVENTION

In a first aspect of the present invention, a flight route generation device includes an acquisition unit configured to acquire the working-area information for designating a plurality of working areas intended for a plurality of operations to be performed by a flight vehicle during its flight and the interregional information for determining a plurality of interregional flight routes along which the flight vehicle is permitted to fly over a plurality of working areas, and a generator configured to generate a plurality of intraregional flight routes for the flight vehicle to fly through the plurality of working areas based on the working-area information and a plurality of interregional flight routes based on the interregional information.

In the above, the acquisition unit may acquire the interregional information representing an order of operations to be performed by the flight vehicle when flying through a plurality of working areas, wherein the generator may generate a plurality of interregional flight routes for the flight vehicle to move over a plurality of working areas according to the order of operations. In addition, the acquisition unit may acquire the interregional information representing at least one via-point which the flight vehicle passes through when flying over a plurality of working areas, wherein the generator may generate an interregional flight route passing through the via-point based on the interregional information.

When the flight vehicle moves between a first working area and a second working area among a plurality of working areas, the generator may generate an interregional flight route for the flight vehicle to move from the first working area to the second working area and a return route for the flight vehicle to return to the first working area from the second working area.

In addition, the acquisition unit may acquire the interregional information representing a flight-permitted area laid between a plurality of working areas, wherein the generator may generate an interregional flight route passing through the flight-permitted area based on the interregional information. Alternatively, the acquisition unit may acquire the interregional information representing a flight-prohibited area for prohibiting the flight vehicle from flying therethrough, which is laid between the plurality of working areas, wherein the generator may generate an interregional flight route not passing through the flight-prohibited area.

Moreover, when the flight vehicle moves between a first working area and a second working area among a plurality of working areas, the acquisition unit may acquire the first information representing a first operation-start point for starting a first operation and a first operation-end point for finishing the first operation in the first working area and the second information representing a second operation-start point for starting a second operation and a second operation-end point for finishing the second operation in the second working area, wherein the generator may generate an interregional flight route connected between the first operation-end point and the second operation-start point.

The acquisition unit may acquire the working-condition information representing a working condition for the flight vehicle to perform an operation for each working area among a plurality of working areas, wherein the generator may generate an intraregional flight route for each working area based on the working-condition information.

In a second aspect of the present invention, a flight route generation method implements: acquiring the working-area information for designating a plurality of working areas intended for a plurality of operations to be performed by a flight vehicle during its flight and the interregional information for determining a plurality of interregional flight routes along which the flight vehicle is permitted to fly over a plurality of working areas; generating a plurality of intraregional flight routes for the flight vehicle to fly through a plurality of working areas based on the working-area information; and generating a plurality of interregional flight routes based on the interregional information.

In a third aspect of the present invention, a non-transitory computer-readable storage media has a stored program causing a computer to implement a flight route generation method via acquiring the working-area information for designating a plurality of working areas intended for a plurality of operations to be performed by a flight vehicle during its flight and the interregional information for determining a plurality of interregional flight routes along which the flight vehicle is permitted to fly over a plurality of working areas; generating a plurality of intraregional flight routes for the flight vehicle to fly through a plurality of working areas based on the working-area information; and generating a plurality of interregional flight routes based on the interregional information.

According to the present invention, it is possible to achieve advantageous effects to generate a flight route used for a flight vehicle to fly above multiple flight regions in a one-time flight while preventing the flight vehicle from entering into a flight-prohibited area.

DETAILED DESCRIPTION OF THE EXEMPLARY EMBODIMENT

The present invention will be described by way of examples with reference to the accompanying drawings, wherein parts identical or similar to those shown in various drawing will be denoted using the same reference signs; hence, duplication descriptions thereof will be omitted here.

1. Overview of Flight Route Generation System

Figure 1:
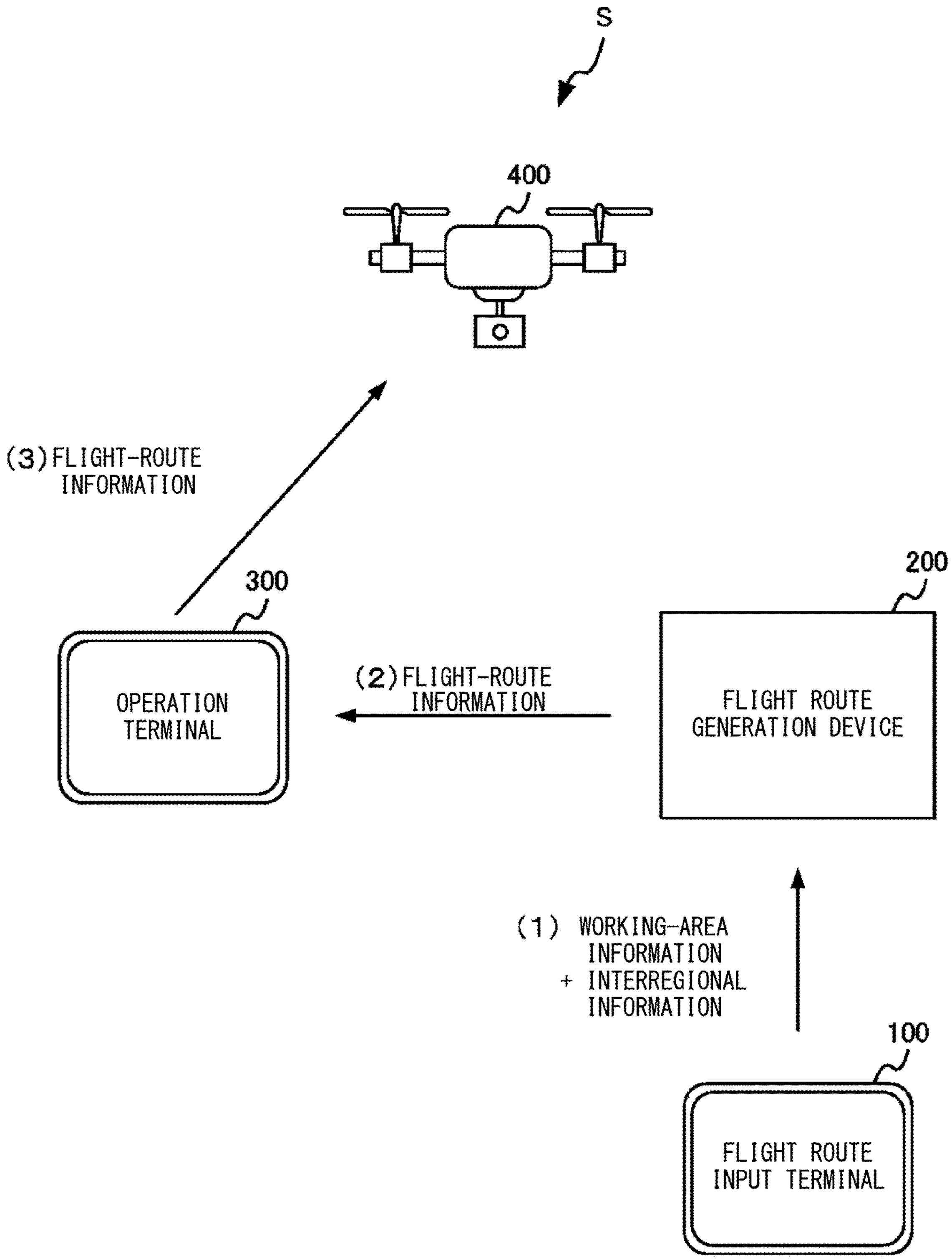
FIG. 1 is a schematic diagram showing the overview of a flight route generation system according to the exemplary embodiment of the present invention.

FIG. 1 is a schematic diagram showing the overview of a flight route generation system S according to the exemplary embodiment of the present invention. FIG. 1 briefly shows a configuration of the flight route generation system S. The flight route generation system S includes a flight route input terminal 100, a flight route generation device 200, an operation terminal 300, and a flight vehicle 400.

The flight route input terminal 100 is configured to communicate with the flight route generation device 200 by radio communication. For example, the flight route input terminal 100 is a tablet terminal. The flight route input terminal 100 accepts a user input to designate a plurality of working areas to be operated during a flight of the flight vehicle 400. The working areas are provided for a user to perform activities such as taking aerial photos covering a certain range of grounds with the flight vehicle 400 and disseminating agricultural chemicals over farms. In addition, the flight route input terminal 100 accepts a user input to identify interregional routes allowing the flight vehicle 400 to move between multiple working areas.

The flight route generation device 200 is configured to generate flight routes for the flight vehicle 400 to fly along. The flight routes include an intraregional flight route for the flight vehicle 400 to fly over a working area as well as an interregional flight route extending over multiple working areas.

The operation terminal 300 is configured to communicate with the flight route generation device 200 and the flight vehicle 400 by radio communication. For example, the operation terminal 300 is a table terminal. For example, the flight vehicle 400 is a drone. The flight vehicle 400 is designed to fly along a flight route which is determined in advance. The flight vehicle 400 is designed to carry out predetermined activities during its flight. For example, the flight vehicle 400 may disseminate agricultural chemicals in the air over farms or take photos of buildings or agricultural produces on grounds.

Hereinafter, a flow of processes made by the flight route generation system S will be described below with reference to FIG. 1. The flight route input terminal 100 transmits to the flight route generation device 200 the working-area information representing a working area designated by a user operation and the interregional information identifying interregional routes (see (1) in FIG. 1).

The flight route generation device 200 is configured to generate an intraregional flight route based on the working-area information acquired from the flight route input terminal 100. In addition, the flight route generation device 200 is configured to generate an interregional flight route based on the interregional information acquired from the flight route input terminal 100. The flight route generation device 200 is configured to transmit to the operation terminal 300 the flight-route information representing a flight route such as the intraregional flight route and the interregional flight route (see (2) in FIG. 1).

The operation terminal 300 is configured to display the flight route, indicated by the flight-route information received from the flight route generation device 200, on screen. The operation terminal 300 may input user operations for editing or defining the flight route. When a user makes an operation to define the flight route upon confirming the flight route on screen, the operation terminal 300 transmits to the flight vehicle 400 the flight-route information representing the flight route which is defined by the user or the edited flight route which is edited by the user (see (3) in FIG. 1). The flight vehicle 400 may fly over the working area along the intraregional flight route indicated by the flight-route information. Alternatively, the flight vehicle 400 may move over multiple working areas along the interregional flight route indicated by the flight-route information.

As described above, the flight route generation device 200 is configured to generate an intraregional flight route along which the flight vehicle 400 may fly over each working area and an interregional flight route along which the flight vehicle 400 may move over multiple working areas. According to the flight route generation device 200, it is possible to generate an intraregional flight route for each working area and an interregional flight route for multiple working areas along which the flight vehicle 400 may fly over multiple working areas in a one-time flight. At this time, the flight route generation device 200 can generate an interregional flight route based on the interregional information; hence, it is possible to prevent the flight vehicle 400 from entering into a flight-prohibited area such as a third-party's land when the flight vehicle 400 moves over multiple working areas.

2. Configuration of Flight Route Input Terminal 100

Figure 2:
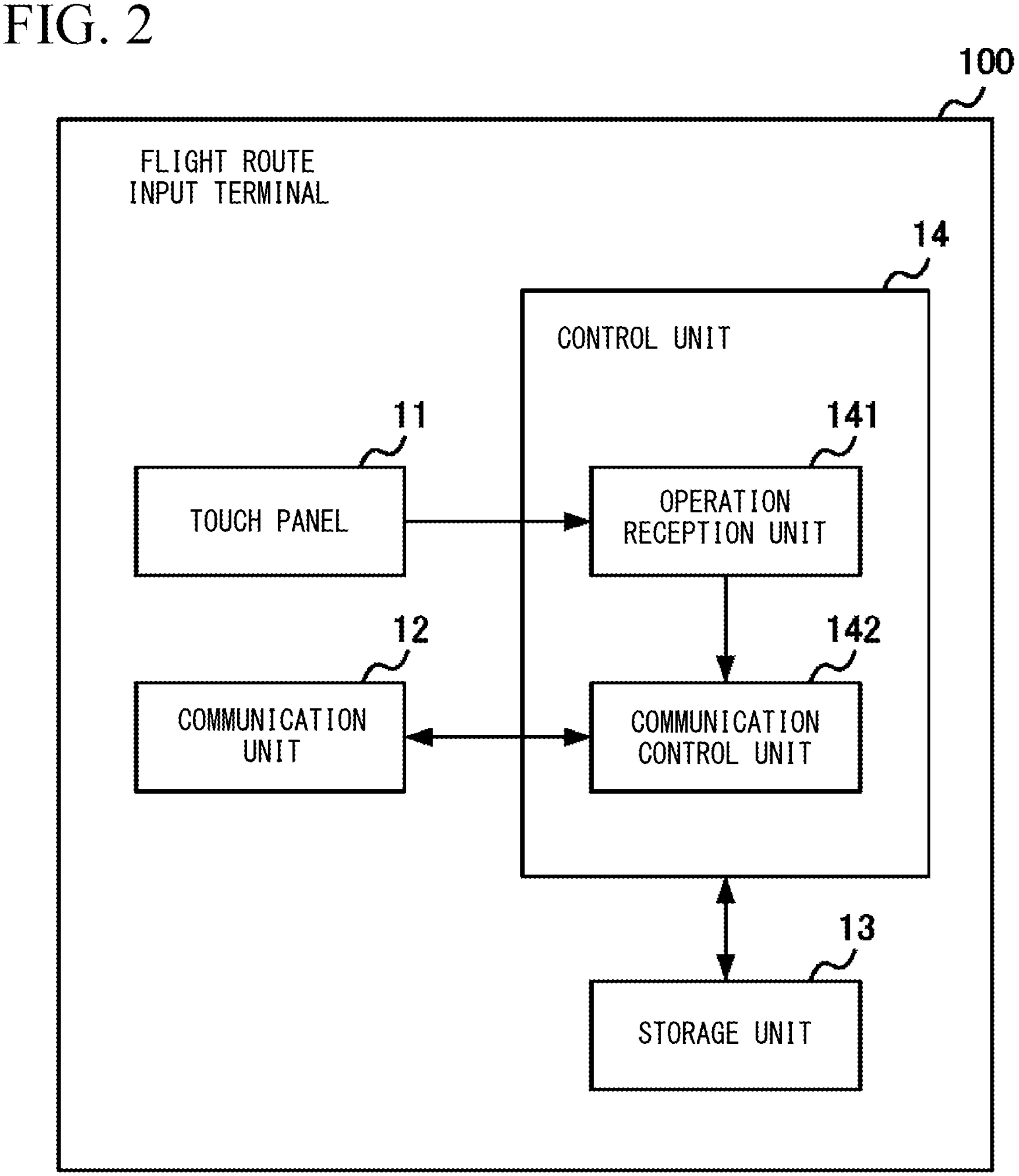
FIG. 2 is a block diagram showing the configuration of a flight route input terminal.

FIG. 2 is a block diagram showing the configuration of the flight route input terminal 100. The flight route input terminal 100 includes a touch panel 11, a communication unit 12, a storage unit 13, and a control unit 14. The touch panel 11 is configured to detect a user touch or a user operation applied to a display surface for displaying images and/or characters. The communication unit 12 is a communication module allowing the flight route input terminal 100 to communicate with the flight route generation device 200 through networks.

The storage unit 13 is configured of storage media such as ROM (Read-Only Memory) and RAM (Random-Access Memory). The storage unit 13 is configured to store programs to be executed by the control unit 14. For example, the control unit 14 is configured of a CPU (Central Processing Unit). The control unit 14 may achieve prescribed functions to realize an operation reception unit 141 and a communication control unit 142 by executing programs stored on the storage unit 13.

Figure 3:
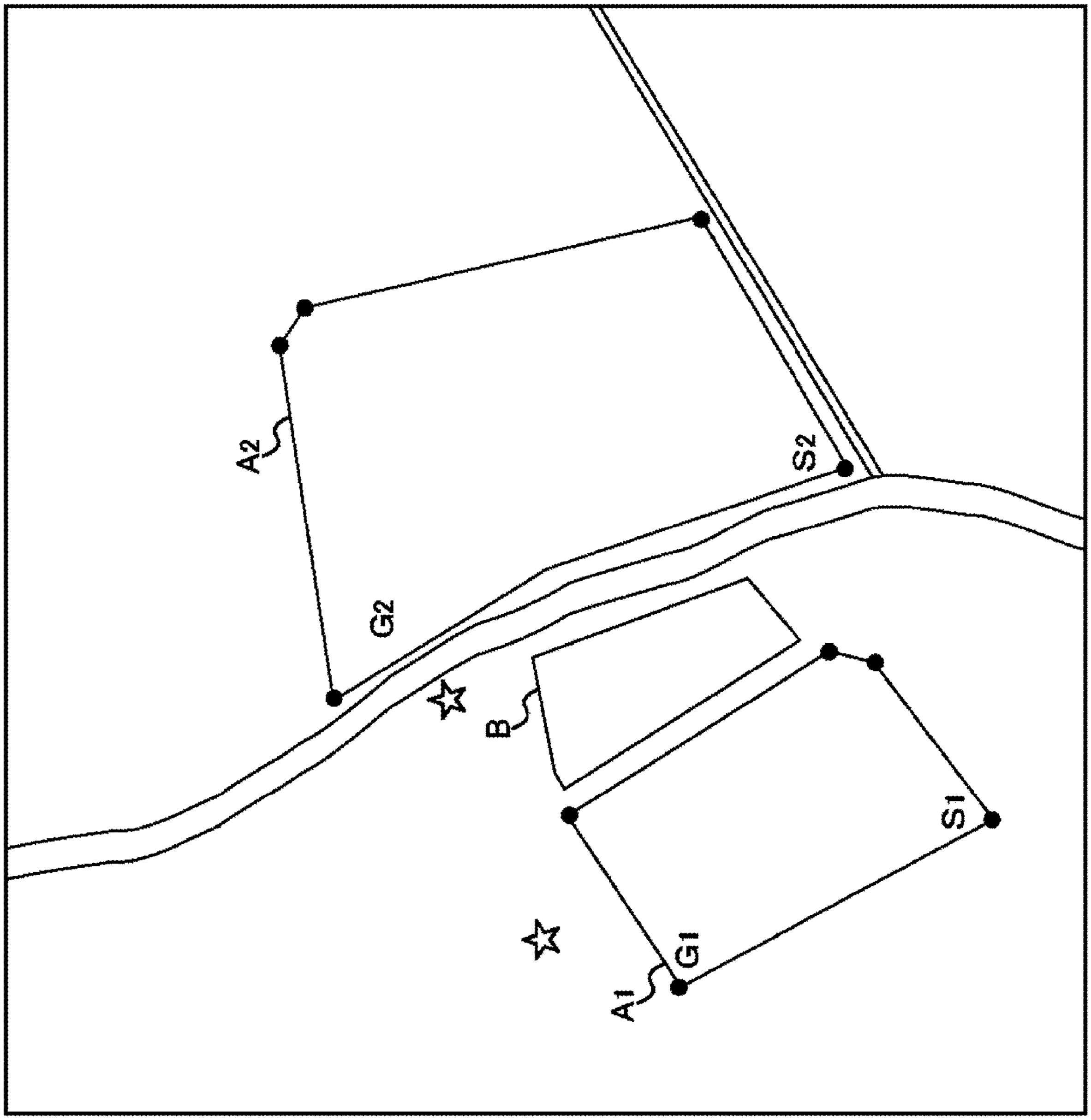
FIG. 3 is a screenshot for a user to manually designate a working area displayed on the flight route input terminal.

The operation reception unit 141 is configured to receive a user operation via the touch panel 11. That is, the operation reception unit 141 is configured to receive a user operation to designate multiple working areas involving activities to be performed by the flight vehicle 400 during its flight. FIG. 3 shows an example of a screenshot for receiving a user operation to designate a working area. FIG. 3 shows a map covering the neighborhood of a place involving a prescribed activity to be performed by the flight vehicle 400 during its flight. The screenshot of FIG. 3 is used to designate working areas $A_1$ and $A_2$ with the operation reception unit 141. Specifically, the operation reception unit 141 receives a user operation to designate vertexes (see black-dot symbols in FIG. 3) of polygons illustrating boundaries of working areas $A_1$ and $A_2$.

In FIG. 3, the operation reception unit 141 receive a user operation to designate a first operation-start point $S_1$ to start a first operation with the flight vehicle 400 and a first operation-end point $G_1$ to end the first operation in the working area $A_1$ designated by the user. In addition, the operation reception unit 141 receive a user operation to designate a second operation-start point $S_2$ to start a second operation with the flight vehicle 400 and a second operation-end point $G_2$ to end the second operation in the working area $A_2$ designated by the user.

The operation reception unit 141 receives a user operation to identify an interregional flight route when the flight vehicle 400 moves between the working area $A_1$ and the working area $A_2$. For example, the operation reception unit 141 receives a user operation to identify a via-point (see a star-like symbol in FIG. 3) which the flight vehicle 400 may go through on the interregional flight route. The operation reception unit 141 generates the interregional information representing a user operation to designate an interregional flight route.

In this connection, the interregional information is not necessarily limited to a via-point plotted on the interregional flight route. For example, the interregional information may identity a flight-prohibited area B laid between the working areas $A_1$ and $A_2$, wherein the flight-prohibited area B prohibits the flight vehicle 400 to fly therethrough. Alternatively, the interregional information may identify a flight-permitted area which is laid between the working areas $A_1$ and $A_2$ and which permits the flight vehicle 400 to fly therethrough. The operation reception unit 141 generates and outputs the interregional information to the communication control unit 142.

The operation reception unit 141 receives a user operation to designate working conditions of activities to be performed by the flight vehicle 400 during its flight. When the flight vehicle 400 is assigned a job to take aerial photos on the ground, for example, it is possible to mention various working conditions such as an imaging angle of view of an imaging device, an overlap ratio representing a ratio of longitudinal overlaps between imaging angles of view in the traveling direction of the flight vehicle 400, and a side-lap ratio of lateral overlaps between imaging angles of view in the lateral/width direction of the flight vehicle 400. When the flight vehicle 400 is assigned a job to disseminate agricultural chemicals, it is possible to mention types of agricultural chemicals and disseminating methods as working conditions.

The operation reception unit 141 receives and outputs the working-area information representing the received working areas, the interregional information, and the working-condition information to the communication control unit 142.

The communication control unit 142 is configured to communicate with the flight route generation device 200 via the communication unit 12. The communication control unit 142 is configured to transmit the working-area information, the interregional information, and the working-condition information to the flight route generation device 200. The communication control unit 142 is configured to transmits the information representing an operation-start point and an operation-end point to the flight route generation device 200.

3. Configuration of Flight Route Generation Device 200

Figure 4:
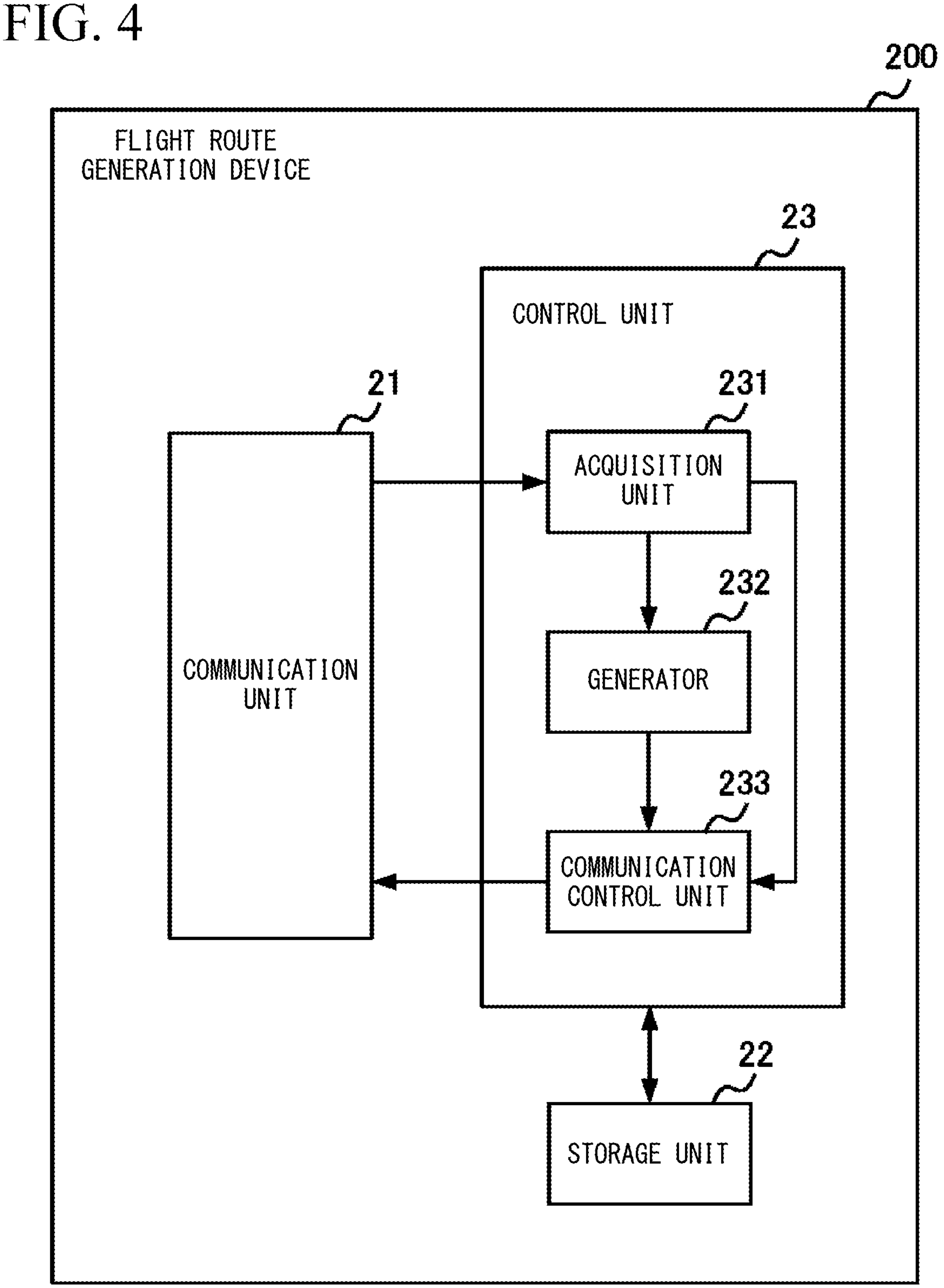
FIG. 4 is a block diagram showing the configuration of a flight route generation device according to the exemplary embodiment of the present invention.

FIG. 4 is a block diagram showing the configuration of the flight route generation device 200. The flight route generation device 200 includes a communication unit 21, a storage unit 22, and a control unit 23. The control unit 23 includes an acquisition unit 231, a generator 232, and a communication control unit 233.

The communication unit 21 is an interface configured to communicate with the flight route input terminal 100 and the operation terminal 300 through networks. The storage unit 22 is configured of storage media such as ROM and RAM. The storage unit 22 is configured to store programs to be executed by the control unit 23. For example, the control unit 23 is configured of a CPU. The control unit 23 may achieve functions to realize the acquisition unit 231, the generator 232, and the communication control unit 233 by executing programs stored on the storage unit 22.

The acquisition unit 231 is configured to acquire various types of information from the flight route input terminal 100 via the communication unit 21. Specifically, the acquisition unit 231 is configured to acquire the working-area information for designating multiple working areas used for the flight vehicle 400 to perform various activities during its flight. In addition, the acquisition unit 231 is configured to acquire the interregional information to identify interregional flight routes along which the flight vehicle 400 may move over multiple working areas. For example, the acquisition unit 231 may acquire the interregional information representing the position of at least one via-point laid between multiple working areas. Alternatively, the acquisition unit 231 may acquire from the flight route input terminal 100 the interregional information representing a flight-prohibited area for prohibiting the flight vehicle 400 to fly therethrough, which is laid between multiple working areas. Moreover, the acquisition unit 231 may acquire from the flight route input terminal 100 the interregional information representing a flight-permitted area laid between multiple working areas.

In addition, the acquisition unit 231 may acquire from an external device (not shown) the interregional information representing a flight-prohibited area which is laid between multiple working areas and which prohibits the flight vehicle 400 to fly therethrough or the interregional information representing a flight-permitted area which is laid between multiple working areas and which permits the flight vehicle 400 to fly therethrough. In this connection, the external device is configured to store a map database for storing the interregional information representing a flight-prohibited area or a flight-permitted area in association with the position information representing the position of the flight-permitted area or the like. The acquisition unit 231 transmits to the external device the position information representing a flight-start point at which the flight vehicle 400 starts flying in the air. The external device identifies the interregional information associated with the position information, representing a position plotted within a predetermined range from the flight-start point indicated by the received position information, in the map database. For example, the predetermined range can be defined as a range of distance which the flight vehicle 400 can reach in a one-time flight. The predetermined range can be set by a user in advance. The acquisition unit 231 may acquire the identified interregional information from the external device.

The acquisition unit 231 is configured to acquire the working-condition information representing working conditions of activities to be performed by the flight vehicle 400 during its flight. In addition, the acquisition unit 231 may acquire the information representing an operation-start point and an operation-end point for each working area. For example, the acquisition unit 231 may acquire the information representing the first operation-start point $S_1$ for starting a first operation and the first operation-end point $G_1$ for ending the first operation in the first working area $A_1$ within multiple working areas $A_1$, $A_2$. In addition, the acquisition unit 231 may acquire the information representing the second operation-start point $S_2$ for starting a second operation and the second operation-end point $G_2$ for ending the second operation in the second working area $A_2$ within multiple working areas $A_1$, $A_2$. The acquisition unit 231 may output to the generator 232 the working-area information, the interregional information, the working-condition information, and the information representing an operation-start point and an operation-end point.

4. Generation of Intraregional Route and Interregional Route

Based on the working-area information acquired by the acquisition unit 231, the generator 232 is configured to generate a plurality of intraregional flight routes along which the flight vehicle 400 may fly over multiple working areas. Based on the interregional information acquired by the acquisition unit 231, the generator 232 is configured to generate an interregional flight route along which the flight vehicle 400 may fly over multiple working areas.

Figure 5:
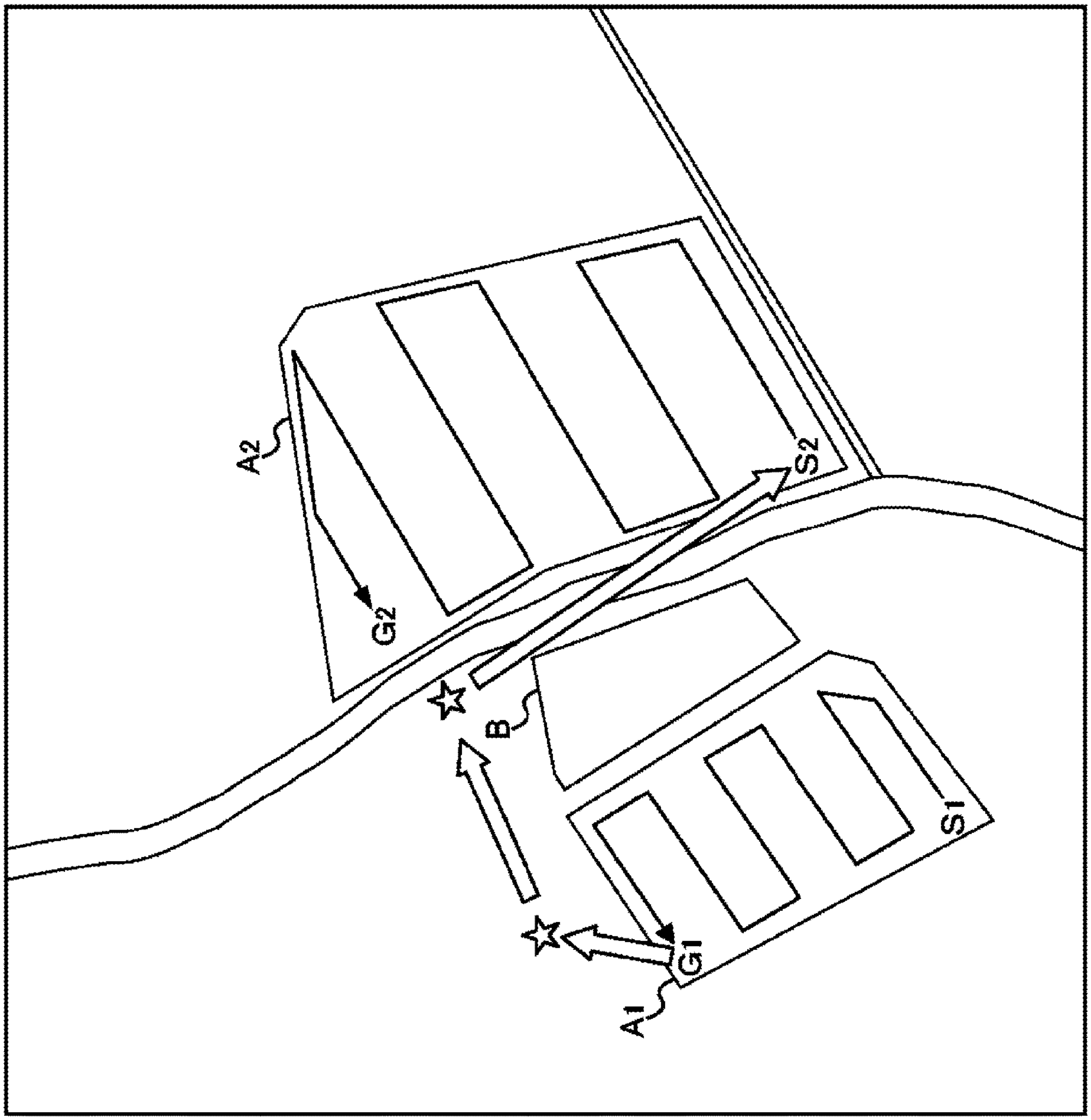
FIG. 5 is schematic diagram showing an exemplary method how to generate an intraregional flight route and an interregional flight route with the flight route generation device.

FIG. 5 is a schematic diagram showing an exemplary method how to generate an intraregional flight route and an interregional flight route with the generator 232 of the control unit 23 included in the flight route generation device 200. FIG. 5 relates to an exemplary job for the flight vehicle 400 to take aerial photos in working areas while flying in the air. The generator 232 is configured to generate intraregional flight routes (see thin arrows drawn in FIG. 5) along which the flight vehicle 400 is controlled to fly of the working areas $A_1$, $A_2$ designated by the working-area information. Specifically, the generator 232 generates an intraregional flight route from the first operation-start point $S_1$ to the first operation-end point $G_1$ in the first working area $A_1$ according to the information acquired by the acquisition unit 231.

At this time, the generator 232 is configured to generate an intraregional flight route based on the working-condition information acquired by the acquisition unit 231. When the flight vehicle 400 is assigned a job of taking aerial photos in the working area $A_1$ on the ground with an imaging device, for example, the generator 232 generates an intraregional flight route such that a side-lap ratio between imaging angles of view may be adjusted to a prescribed value described in the working-condition information. Similarly, the generator 232 is configured to generate an intraregional flight route (see bold arrows drawn in FIG. 5) along which the flight vehicle 400 may fly in a direction from the second operation-start point $S_2$ to the second operation-end point $G_2$ in the working area $A_2$ according to the information acquired by the acquisition unit 231.

The generator 232 is configured to generate an interregional flight route along which the flight vehicle 400 moves in a direction from the working area $A_1$ to the working area $A_2$. The generator 232 generates an interregional flight route connected between the first operation-end point $G_1$ of the working area $A_1$ and the second operation-start point $S_2$ of the working area $A_2$. At this time, the generator 232 generates an interregional flight route passing through via-points (see star-like symbols in FIG. 5) laid between the working areas $A_1$ and $A_2$, which are indicated by the interregional information.

As shown in FIG. 5, the flight-prohibited area B is laid between the working area $A_1$ and the working area $A_2$. In this connection, the generator 232 is able to generate an interregional flight route bypassing the flight-prohibited area B by generating the interregional flight route passing through via-points identified by the user.

When the acquisition unit 231 acquires the interregional information representing the flight-prohibited area B which is laid between the working areas $A_1$, $A_2$ and which prohibits the flight vehicle 400 from flying therethrough, the generator 232 may generate an interregional flight route which instructs the flight vehicle 400 not to go through the flight-prohibited area B. When the acquisition unit 231 acquires the interregional information representing a flight-permitted area which permits the flight vehicle 400 to fly therethrough over the working areas $A_1$, $A_2$, the generator 232 may generate an interregional flight route which instructs the flight vehicle 400 to go through the flight-permitted area indicted by the interregional information.

Alternatively, the generator 232 may generate an interregional flight route based on the interregional information representing both the via-points and the flight-prohibited area (or the flight-permitted area). For example, the generator 232 may generate an interregional flight route which instructs the flight vehicle 400 to pass through the via-points but not to go through the flight-prohibited area. Similarly, the generator 232 may generate an interregional flight route based on the interregional information representing both the via-points and the flight-permitted area. For example, the generator 232 may generate an interregional flight route which instructs the flight vehicle 400 to pass through the via-points and to go through the flight-permitted area.

5. Generation of Return Route

Figure 6:
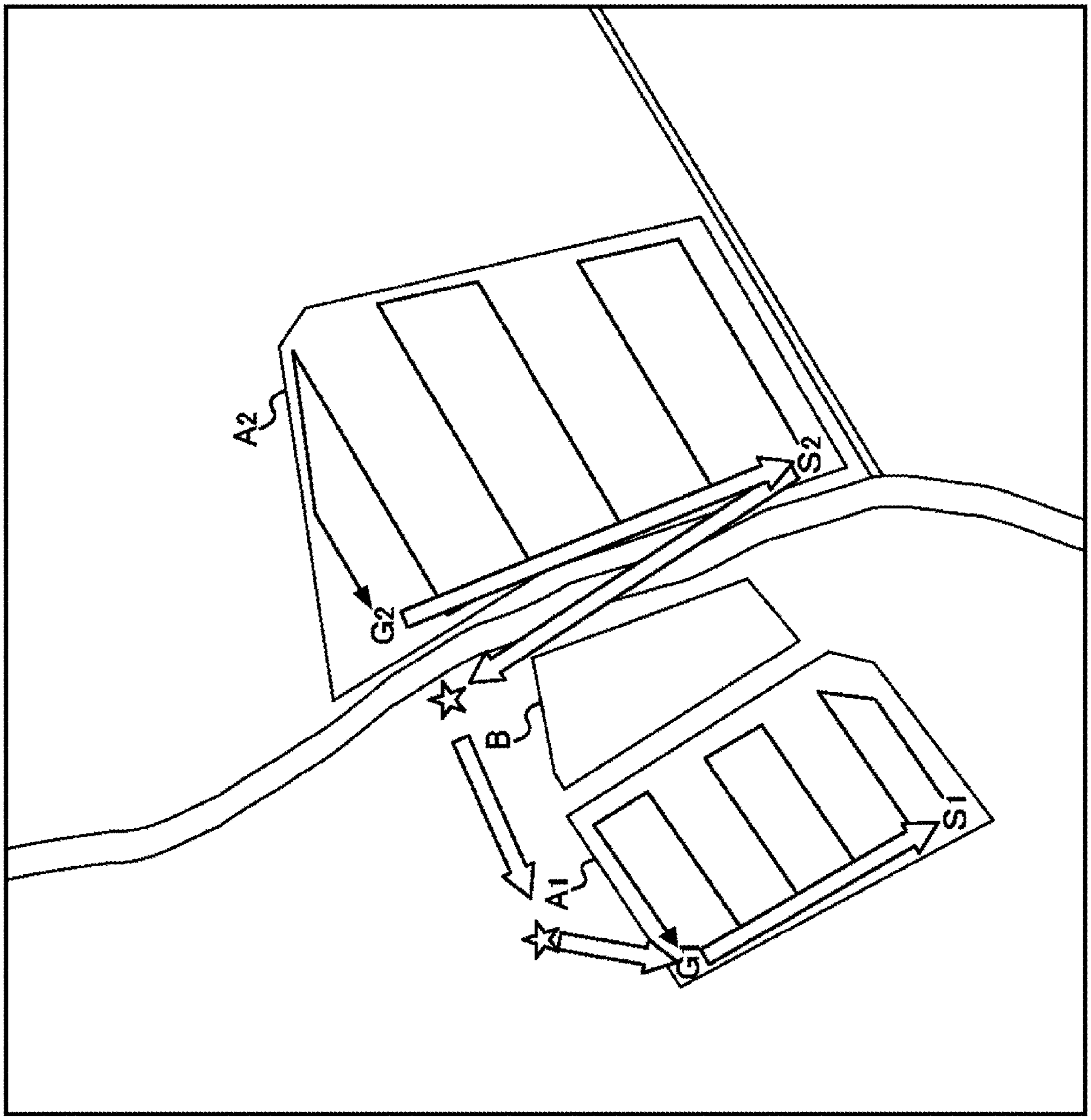
FIG. 6 is a schematic diagram showing an exemplary method how to generate a return route with the flight route generation device.

In addition to generating an interregional flight route for the flight vehicle 400 to move from the first working area $A_1$ to the second working area $A_2$, the generator 232 may generate a return route for the flight vehicle 400 to return to the first working area $A_1$ from the second working area $A_2$ after completing a second operation in the second working area $A_2$. FIG. 6 shows an example of a return route generated by the generator 232. That is, the generator 232 may generate a return route for the flight vehicle 400 to return to the first operation-start point $S_1$ of the first working area $A_1$ from the second operation-end point $G_2$ of the second working area $A_2$. According to the return route, the flight vehicle 400 is controlled to return from the second operation-end point $G_2$ to the second operation-start point $S_2$ of the second working area $A_2$ via the shortest route.

According to the return route, the flight vehicle 400 subsequently moves in a reverse flight route reverse to the interregional flight route along which the flight vehicle 400 moved from the first working area $A_1$ to the second working area $A_2$, whereby the flight vehicle 400 will return to the first operation-end point $G_1$ of the first working area $A_1$ from the second operation-start point $S_2$ of the second working area $A_2$. According to the return route, the flight vehicle 400 finally returns to the first operation-start point $S_1$ from the first operation-end point $G_1$ in the first working area $A_1$ via the shortest route. When the first operation-start point $S_1$ is not a flight-start position, the generator 232 may generate a further return route for the flight vehicle 400 to return to its flight-start position from the first operation-start point $S_1$.

In the above, the generator 232 is not necessarily configured to generate a return route for the flight vehicle 400 to move in a revere flight route reverse to the interregional flight route from the first operation-end point $G_1$ to the second operation-start point $S_2$. For example, the generator 232 may generate a return route which is different from the interregional flight route but which passes through the same via-point (see a star-like symbol in FIG. 6) included in the interregional flight route from the first operation-end point $G_1$ to the second operation-start point $S_2$. Alternatively, the generator 232 may generate a return route along which the flight vehicle 400 moves from the second operation-start point $S_2$ to the first operation-end point $G_1$ but which passes through a different via-point than the via-point included in the interregional flight route from the first operation-end point $G_1$ to the second operation-start point $S_2$.

The communication control unit 233 is configured to communicate with the operation terminal 300 via the communication unit 21. The communication control unit 233 is configured to transmit to the operation terminal 300 the flight-route information including the intraregional flight route and the interregional flight route. In addition, the communication control unit 33 is configured to transmit to the operation terminal 300 the operation-condition information acquired by the acquisition unit 231. Moreover, the communication control unit 233 is configured to transmit to the operation terminal 300 the information representing an operation-start point and an operation-end point for each working area.

6. Configuration of Operation Terminal 300

Figure 7:
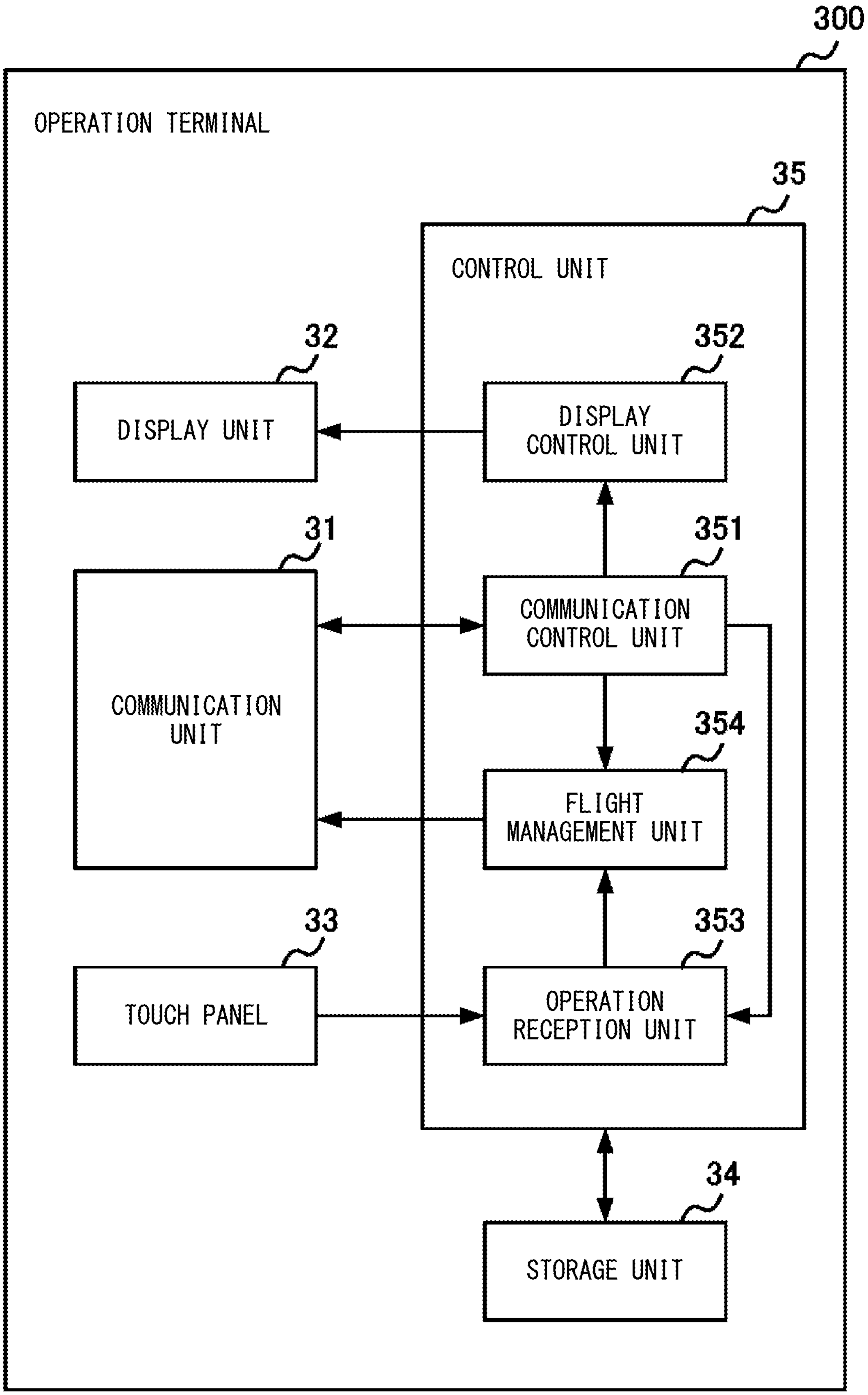
FIG. 7 is a block diagram showing the configuration of an operation terminal.

FIG. 7 shows the configuration of the operation terminal 300. The operation terminal 300 includes a communication unit 31, a display unit 32, a touch panel 33, a storage unit 34, and a control unit 35. The control unit 35 includes a communication control unit 351, a display control unit 352, an operation reception unit 353, and a flight management unit 354.

The communication unit 31 is an interface configured to communicate with the flight route generation device 200 and the flight vehicle 400 through networks. In the exemplary embodiment, for example, the communication unit 31 is configured to communicate with the flight vehicle 400 via a repeater apparatus (or a relay station). The display unit 32 is configured to display images and characters on screen. The touch panel 33 is configured to detect a user operation applied to the screen of the display unit 32.

The storage unit 34 is configured of storage media including ROM, RAM, or the like. The storage unit 34 is configured to store programs to be executed by the control unit 35. For example, the control unit 35 is configured of a CPU. The control unit 35 can achieve functions to realize the communication control unit 351, the display control unit 352, the operation reception unit 353, and the flight management unit 354 by executing programs stored on the storage unit 34.

The communication control unit 352 is configured to communicate with the flight route generation device 200 via the communication unit 31. The communication control unit 351 is configured to receive the working-condition information and the flight-route information generated by the flight route generation device 200. The communication control unit 351 is configured to receive the information representing an operation-start point and an operation-end point for each working area. The flight control unit 351 may receive the output the flight route information to the display control unit 352, the operation reception unit 353, and the flight management unit 354. In addition, the communication control unit 351 may receive and output the operation-condition information to the flight management unit 354.

The display control unit 352 is configured to display various types of information on the screen of the display unit 32. For example, the display control unit 352 may display a flight route, represented by the flight-route information received by the communication control unit 351, on the screen of the display unit 32. The display control unit 352 may display a button (e.g., an OK button), which can be operated by a user to define a flight route, and another button allowing the user to edit the flight route.

The operation reception unit 353 is configured to receive a user operation via the touch panel 33. The operation reception unit 353 may receive a user operation to define the flight route indicated by the flight-route information or a user operation to edit the flight route. In addition, the operation reception unit 353 may receive a user operation to instruct completion of editing the flight route.

The operation reception unit 353 may receive a user operation to instruct a flight-start time of the flight vehicle 400. Subsequently, the operation reception unit 353 may output to the flight management unit 354 the time information representing the flight-start time and the flight-route information representing the already-defined flight route (or the edited flight route when edited by a user operation).

The flight management unit 354 is configured to communicate with the flight vehicle 400 via the communication unit 31. The flight management unit 354 is configured to transmit the flight-route information to the flight vehicle 400. The flight management unit 354 is configured to transmit to the flight vehicle 400 the working-condition information received by the communication control unit 351. In addition, the flight management unit 354 is configured to transmit the time information to the flight vehicle 400. Moreover, the flight management unit 354 is configured to transmit to the flight vehicle 400 the information representing an operation-start point and an operation-end point for each working area.

7. Configuration of Flight Vehicle 400

Figure 8:
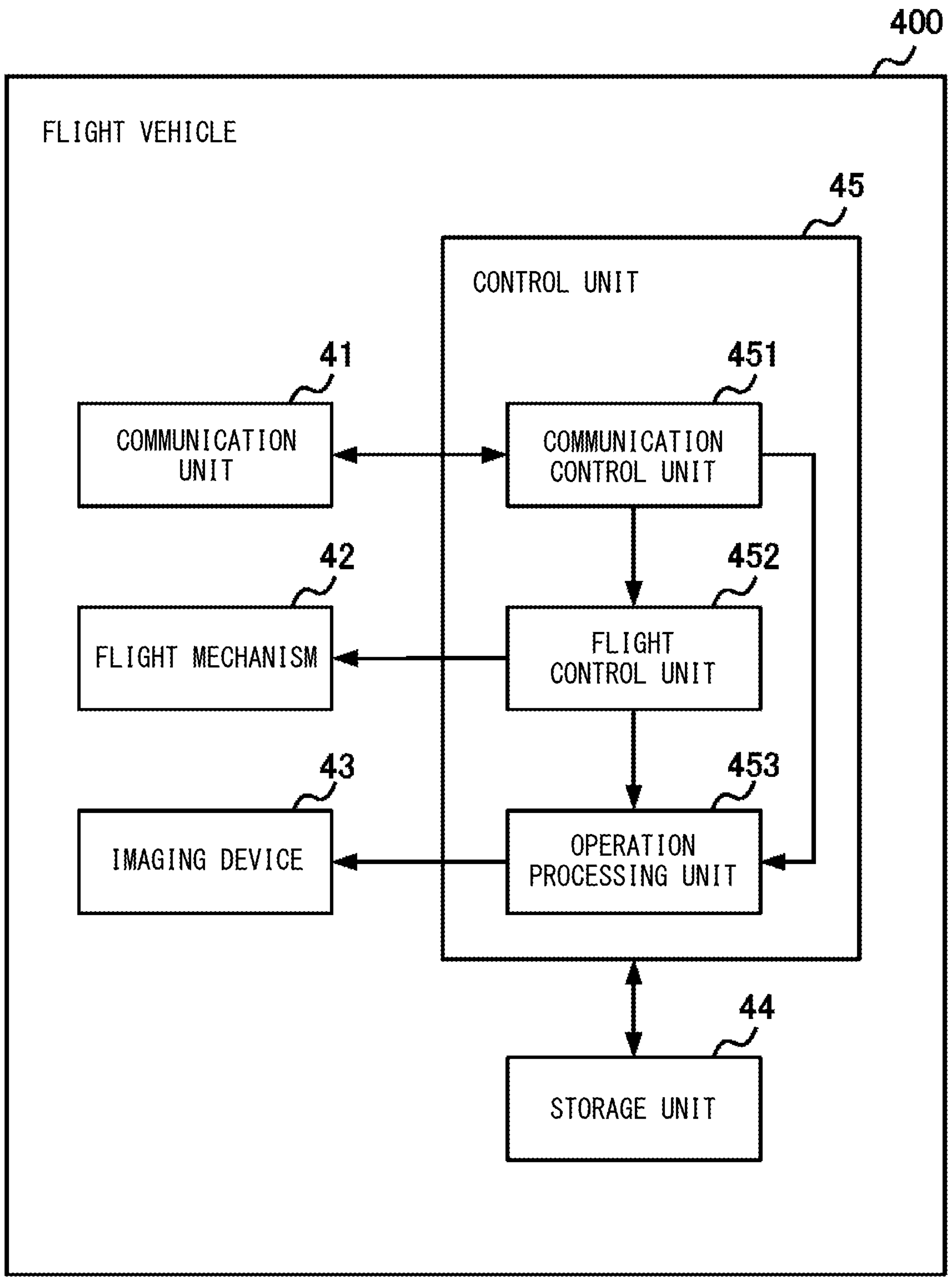
FIG. 8 is a block diagram showing the configuration of a flight vehicle.

FIG. 8 is a block diagram showing the configuration of the flight vehicle 400. The flight vehicle 400 includes a communication unit 41, a flight mechanism 42, an imaging device 43, a storage unit 44, and a control unit 45. The control unit 45 includes a communication control unit 451, a flight control unit 452, and an operation processing unit 453.

The communication unit 41 is a communication module configured to wirelessly communicate with the operation terminal 300 via a repeater apparatus. For example, the flight mechanism 42 includes motors configured to rotate multiple rotors. The imaging device 43 is configured to take photos of images beneath the flight vehicle 400 during its flight.

The storage unit 44 is configured of storage media including ROM, RAM, or the like. The storage unit 44 is configured to store programs to be executed by the control unit 45. For example, the control unit 45 is configured of a CPU. The control unit 45 can achieve functions to realize the communication control unit 451, the flight control unit 452, and the operation processing unit 453 by executing programs stored on the storage unit 44.

The communication control unit 451 is configured to communicate with the operation terminal 300 via the communication unit 41. The communication control unit 451 is configured to receive the flight-route information and the working-condition information. The communication control unit 451 is configured to receive the time information representing a flight-start time. The communication control unit 451 is configured to receive the information representing an operation-start point and an operation-end point for each working area. The communication control unit 451 may receive and output the flight-route information and the time information to the flight control unit 42. In addition, the communication control unit 451 may receive and output the flight-route information and the working-condition information to the operation processing unit 453. Moreover, the communication control unit 451 may transmit the information representing a flight condition such as a battery level of the flight vehicle 400 to the operation terminal 300, which in turn displays the battery level on the screen of the display unit 32.

The flight control unit 452 is configured to control the flight vehicle 400 to fly in the air by generating a control signal to drive the flight mechanism 42. The flight control unit 452 controls the flight vehicle 400 to start flying at a flight-start time indicated by the time information. The flight control unit 452 controls the flight vehicle 400 to fly along flight routes such as an intraregional flight route, an interregional flight route, and a return route included in the flight-route information received by the communication control unit 451. Specifically, the flight control unit 452 may control the flight vehicle 400 to fly along an intraregional flight route in each working area. In addition, the flight control unit 452 may control the flight vehicle 400 to fly along an interregional flight route over multiple working areas. Moreover, the flight control unit 452 may control the flight vehicle 400 to fly along the return route from the operation-end point of the working area, in which the operation processing unit 453 has carried out a last operation, to the flight-start position.

The operation processing unit 453 is configured to carry out a predetermined operation during the flight of the flight vehicle 400 under the control of the flight control unit 452. For example, the operation processing unit 453 may control the imaging device 43 to take photos of images beneath the flight vehicle 400 during its flight. The operation processing unit 453 is configured to identify the current position of the flight vehicle 400 using a GPS (Global Positioning System) sensor (not shown), wherein the operation processing unit 543 starts a prescribed operation when the flight vehicle 400 reaches the operation-start point and then finishes the prescribed operation when the flight vehicle 400 reaches the operation-end point. For example, the operation processing unit 453 may control the imaging device 43 to take photos of images beneath the flight vehicle 400 in an imaging cycle in which the overlap ratio of imaging angles of view becomes equal to a prescribed value indicated by the working-condition information.

8. Procedure of Generating Flight Route

Figure 9:
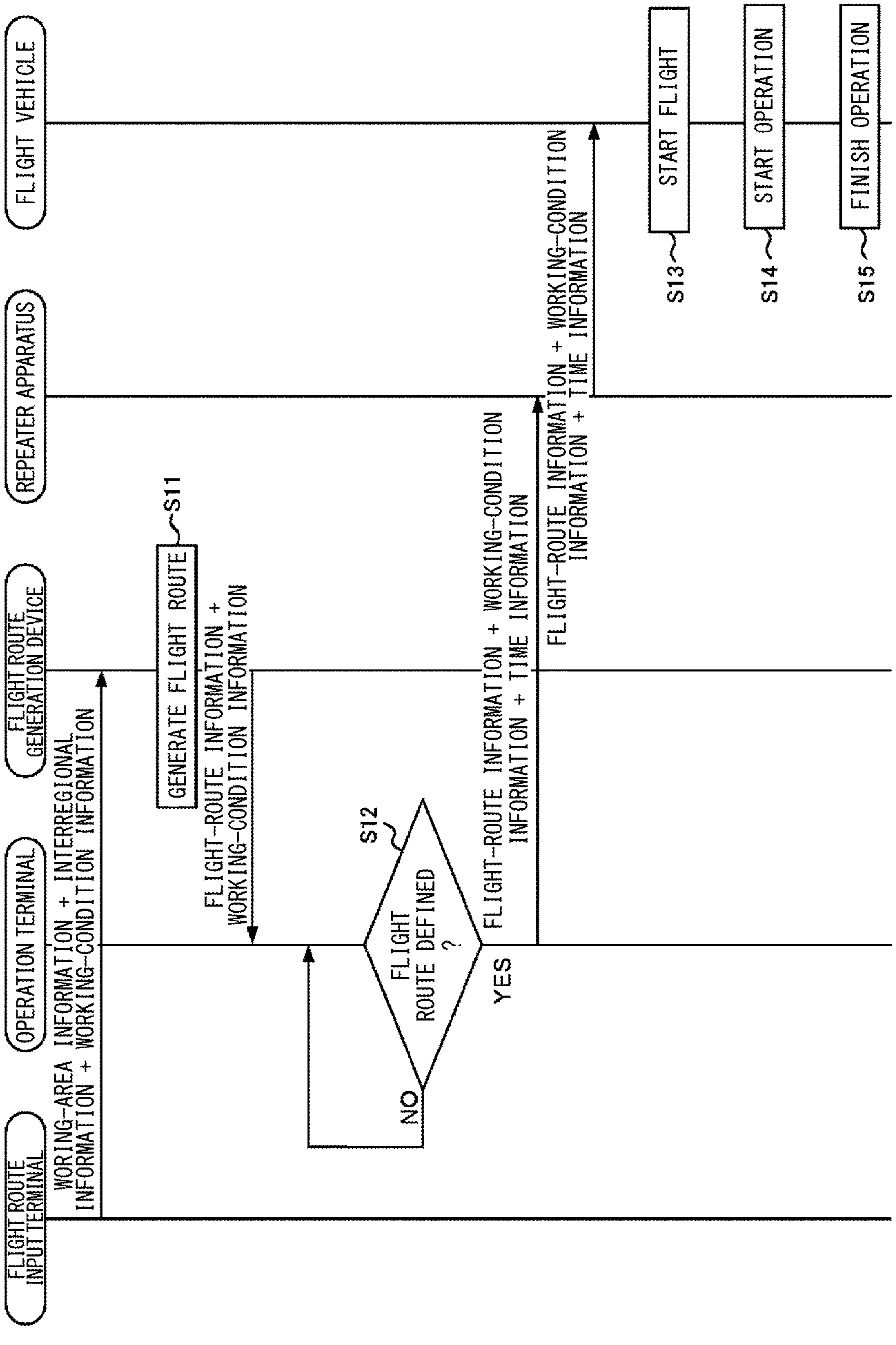
FIG. 9 is a sequence diagram showing a procedure to generate a flight route according to the flight route generation system.

FIG. 9 is a sequence diagram showing a procedure to generate a flight route according to the flight route generation system S (see a series of steps S11 through S15). For example, the procedure is started upon applying power to the flight route input terminal 100. The operation reception unit 141 of the flight route input terminal 100 may receive a user operation to designate multiple working areas subjected to a prescribed operation to be carried out by the flight vehicle 400 during its flight. In addition, the operation reception unit 141 may receive a user operation to designate working conditions for a prescribed operation to be carried out by the flight vehicle 400 during its flight. Moreover, the operation reception unit 141 may receive a user operation to determine an interregional flight route for the flight vehicle 400 to move over multiple working areas.

The communication control unit 142 of the flight route input terminal 100 transmits to the flight route generation device 200 the working-area information representing working areas received by the operation reception unit 141, the interregional information representing a user operation to identify an interregional route, and the working-condition information representing working conditions to be implemented by the flight vehicle 400 during its flight. The generator 232 of the flight route generation device 200 may generate flight routes such as an intraregional flight route and an interregional flight route (S11).

The communication control unit 233 of the flight route generation device 200 transmits to the operation terminal 300 the flight-route information representing flight routes generated by the generator 232. In addition, the communication control unit 233 transmits to the operation terminal 300 the working-condition information acquired by the acquisition unit 231.

The operation reception unit 353 of the operation terminal 300 receives a user operation to define or edit the flight routes included in the flight-route information. In addition, the operation reception unit 353 receives a user operation to designate a flight-start time of the flight vehicle 400. The flight management unit 354 determines whether or not the operation reception unit 353 has received a user operation to define the flight routes (S12). Upon determining that the operation reception unit 353 has received a user operation to define the flight routes (i.e., YES of S12), the flight management unit 354 transmits to a repeater apparatus the flight-route information representing the already-defined flight routes, the working-condition information representing working conditions, and the time information representing a flight-start time of the flight vehicle 400. The repeater apparatus repeats and transmits the flight-route information, the working-condition information, and the time information to the flight vehicle 400.

The flight control unit 452 of the flight vehicle 400 controls the flight vehicle 400 to starts flying at the flight-start time indicated by the time information received by the communication control unit 451 (S13). In this connection, the flight control unit 452 does not necessarily start the flight of the flight vehicle 400 immediately after the flight-start time in consideration of safety standards. For example, the flight control unit 452 may be set to a standby state ready to start flight at the flight-start time, and then the flight control unit 452 may start flight on the condition that the communication control unit 451 receives a flight-start command, instructing the flight vehicle 400 to start flying in the air, from the operation terminal 300 in the standby state. The operation processing unit 453 starts to perform a prescribed operation indicated by the working-condition information with the flight vehicle 400 when the flight vehicle 400 reaches an operation-start point in a working area according to the working-condition information (S14). The operation processing unit 453 finishes the prescribed operation when the flight vehicle 400 reaches an operation-end point in the working area (S15). Thus, the flight route generation system S exits the processing described above. Upon determining that the operation reception unit 353 has not received a user operation to define flight routes in step S12 (i.e., NO of S12), the flight management unit 354 may repeat the step S12.

9. Variation

The exemplary embodiment refers to a scenario in which the acquisition unit 231 of the flight route generation device 200 is configured to acquire the interregional information representing a via-point which the flight vehicle 400 should pass through when moving over multiple working areas; however, the present invention is not necessarily limited to this scenario. The acquisition unit 232 may acquire the interregional information representing an order of operations to be performed by the flight vehicle 400 over multiple working areas. For example, the operation reception unit 141 of the flight route input terminal 100 may generate the interregional information upon receiving a user operation to designate an order of operations to be performed by the flight vehicle 400.

Figure 10:
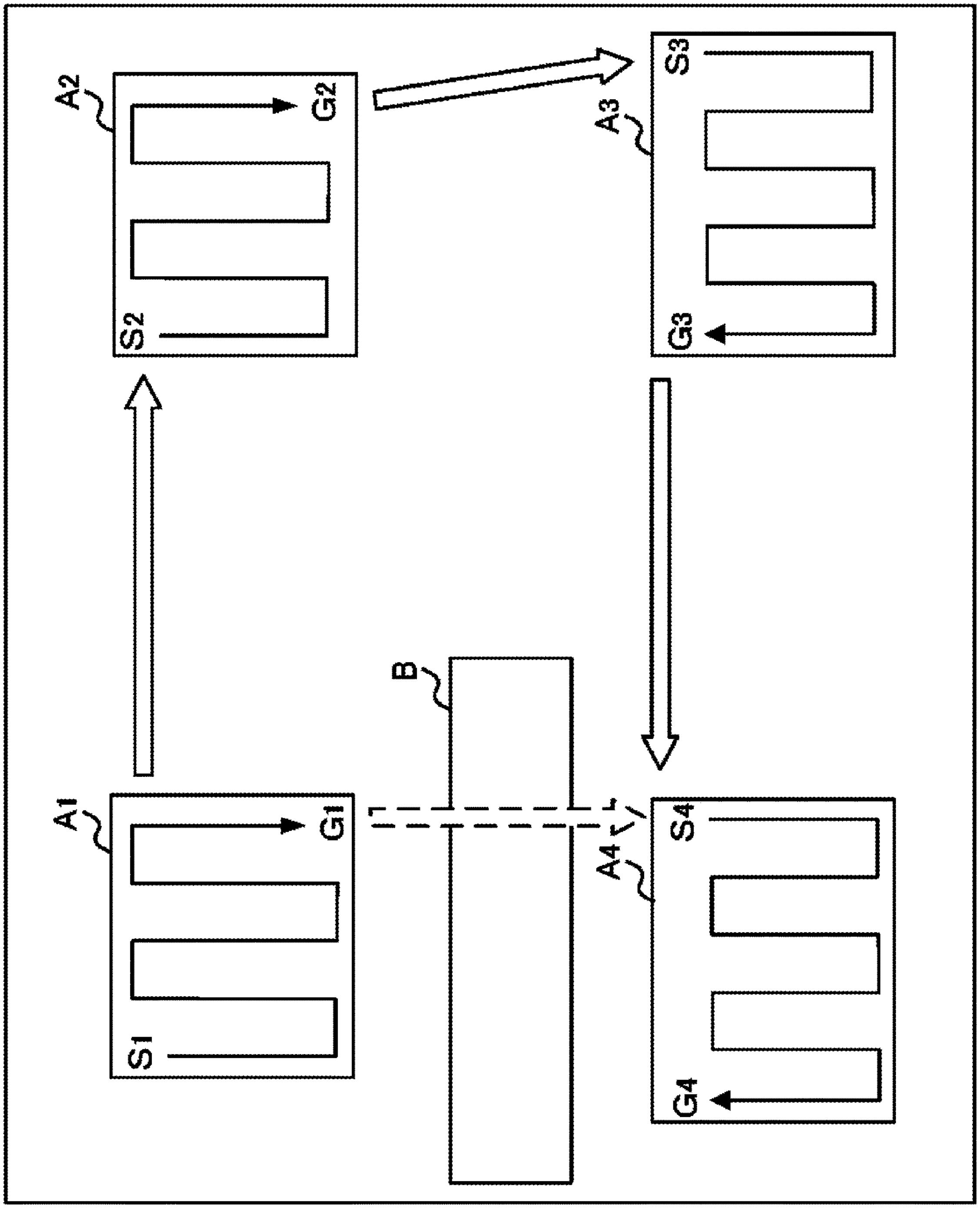
FIG. 10 is a schematic diagram showing an exemplary method how to generate an interregional flight route with a flight route generation device according to a variation of the exemplary embodiment.

The generator 232 of the flight route generation device 200 may generate multiple interregional routes for the flight vehicle 400 to move over multiple working areas to achieve an order of operations indicated by the interregional information acquired by the acquisition unit 231. FIG. 10 is a schematic diagram showing an exemplary method of how to generate interregional routes with the generator 232 of the flight route generation device 200 according to a variation of the exemplary embodiment. FIG. 10 shows a map of the neighborhood including multiple working areas $A_1$ through $A_4$ over which the flight vehicle 400 should achieve an order of operations. FIG. 10 shows multiple working areas $A_1$ through $A_4$ and the flight-prohibited area B prohibiting the flight of the flight vehicle 400.

FIG. 10 shows the operation-start point $S_1$ and the operation-end point $G_1$ of the working area $A_1$, the operation-start point $S_2$ and the operation-end point $G_2$ of the working area $A_2$ as well as an operation-start point $S_3$ and an operation-end point $G_3$ of a working area $A_3$, an operation-start point S4 and an operation-end point $G_4$ of a working area $A_4$. In FIG. 10, thin-solid-line arrows show intraregional flight routes in the working areas $A_1$ through $A_4$, while bold-line arrows show interregional flight routes over the working areas $A_1$ through $A_4$.

FIG. 10 shows an exemplary scenario in which the acquisition unit 231 of the flight route generation device 200 has acquired the interregional information which instructs the flight vehicle 400 to carry out a series of operation in an order of the working areas $A_1$, $A_2$, $A_3$, and $A_4$. At this time, the generator 232 of the flight route generation device 200 generates an interregional flight route from the working area $A_1$ to the working area $A_2$, an interregional flight route from the working area $A_2$ to the working area $A_3$, and an interregional flight route from the working area $A_3$ to the working area $A_4$ as shown by bold-line arrows in FIG. 10.

If the generator 232 generated an interregional flight route directly from the working area $A_1$ to the working area $A_4$ (see a bold-dotted-line arrow in FIG. 10), the flight route generation device 200 suffers from a problem in that the generator 232 might have generated an unpermitted interregional flight route passing through the flight-prohibited area B. In this variation, the flight route generation device 200 is designed to generate a series of interregional flight routes for the flight vehicle 400 to fly over multiple working areas $A_1$ through $A_4$ in an order designated by a user, wherein the generator 232 is configured to generate a series of interregional flight routes bypassing the flight-prohibited area B.

For example, programs realizing a flight route generation method of the exemplary embodiment will be provided as a WEB application to be executed by the flight route generation device 200. Flight routes generated by this application will be displayed on the screen of the operation terminal 300 via a WEB browser. In this connection, programs realizing a flight route generation method of the exemplary embodiment can be provided as applications to be executed by the flight route input terminal 100 or the operation terminal 300.

As described above, the foregoing embodiment is designed to provide the flight route input terminal 100 and the operation terminal 300 as independent apparatuses; however, this is not a restriction in the present invention. That is, it is possible to provide a single apparatus unifying the flight route input terminal 100 and the operation terminal 300. Alternatively, it is possible to provide a single apparatus unifying at least two or more of the flight route input terminal 100, the flight route generation device 200, and the operation terminal 300. In addition, the present embodiment is not necessarily limited to the foregoing embodiment in which the flight route generation device 200 and a repeater apparatus are provided as independent apparatuses. For example, it is possible to provide a single apparatus unifying the flight route generation device 200 and the repeater apparatus.

10. Advantageous Effects of Flight Paten Generation Device 200

In the flight route generation device 200, the generator 232 is configured to generate intraregional flight routes for the flight vehicle 400 to fly in multiple working areas and interregional flight routes for the flight vehicle 100 to fly over multiple working areas. That is, the generator 232 is able to generate a plurality of intraregional flight routes and a plurality of interregional flight routes for the flight vehicle 400 to fly over multiple working areas in a one-time flight. At this time, the generator 232 is configured to generate interregional flight routes based on the interregional information acquired by the acquisition unit 231, and therefore it is possible to prevent the flight vehicle 400 from inadvertently entering into a flight-prohibited area such as a third-party's land when the flight vehicle 400 is flying over multiple working areas. In this connection, the present invention may contribute to Sustainable Development Goals (SDGs) initiated by the United Nations (UN), in particular, Goal 9 “Industry, Innovation and Infrastructure”.

Heretofore, the present invention has been described by way of the foregoing embodiments (e.g., the exemplary embodiment and its variation), wherein the technical scope of the invention is not necessarily limited to the foregoing embodiments; hence, it is possible to create and introduce any other variations and modifications within the subject matter of the invention. For example, it is possible to physically or functionally disperse or integrate part or entirety of the foregoing devices in arbitrary units of components. In addition, the present invention may embrace any new examples produced by arbitrarily combining the foregoing embodiments. It can be said that new examples produced by combinations of the foregoing embodiments will offer the same advantageous effects as the exemplary embodiment.

While the preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A flight route generation device comprising:

at least one memory configured to store instructions; and at least one processor configured to execute the instructions to:

acquire working-area information for designating a plurality of working areas intended for a plurality of operations to be performed by a flight vehicle during a flight of the flight vehicle and via-point information representing a position of at least one via-point, identified by a user, which the flight vehicle passes through when flying over the plurality of working areas;

generate a plurality of intraregional flight routes for the flight vehicle to fly through the plurality of working areas based on the working-area information and an interregional flight route, passing via the at least one via-point, for the flight vehicle to move from a first working area to a second working area based on the via-point information;

acquire, when the flight vehicle moves between the first working area and the second working area among the plurality of working areas, first information, identified by the user, representing a first operation-start point for starting a first operation and a first operation-end point, which indicates a different position from the first operation-start point, for finishing the first operation in the first working area and second information, identified by the user, representing a second operation-start point for starting a second operation and a second operation-end point, which indicates a different position from the second operation-start point, for finishing the second operation in the second working area; and generate the interregional flight route from the first operation-end point in the first working area to the second operation-start point in the second working area, which is different from the first working area.

2. The flight route generation device according to claim 1, wherein the at least one processor is configured to execute the instructions to:

acquire interregional information representing an order of operations to be performed by the flight vehicle when flying through the plurality of working areas, and generate the interregional flight route for the flight vehicle to move over the plurality of working areas according to the order of operations.

3. The flight route generation device according to claim 1, wherein the at least one processor is configured to execute the instructions to generate, when the flight vehicle moves between the first working area and the second working area among the plurality of working areas, the interregional flight route for the flight vehicle to move from the first working area to the second working area and a return route for the flight vehicle to return to the first working area from the second working area.

4. The flight route generation device according to claim 3, wherein the at least one processor is configured to execute the instructions to generate the return route including a route reverse to the generated interregional flight route, for the flight vehicle to return to the first working area from the second working area.

5. The flight route generation device according to claim 3, wherein the at least one processor is configured to execute the instructions to:

acquire second information representing a second operation-start point for starting a second operation and a second operation-end point for finishing the second operation in the second working area; and generate the return route that includes a partial route, from the second operation-end point return to the second operation-start point, which is shorter than a route from the second operation-start point to the second operation-end point included in the plurality of intraregional flight routes.

6. The flight route generation device according to claim 1, wherein the at least one processor is configured to execute the instructions to:

acquire information representing a flight-permitted area laid between the plurality of working areas, and generate the interregional flight route that passes via the at least one via-point and passes through the flight-permitted area.

7. The flight route generation device according to claim 1, wherein the at least one processor is configured to execute the instructions to:

acquire information representing a flight-prohibited area for prohibiting the flight vehicle from flying therethrough, which is laid between the plurality of working areas, and generate the interregional flight route that passes via the at least one via-point and does not pass through the flight-prohibited area.

8. The flight route generation device according to claim 1, wherein the at least one processor is configured to execute the instructions to:

acquire working-condition information representing a working condition for the flight vehicle to perform an operation for each working area among the plurality of working areas, and generate an intraregional flight route for each working area based on the working-condition information.

9. The flight route generation device according to claim 1, wherein the at least one processor is configured to execute the instructions to:

generate a return route including a route for the flight vehicle to return to the first operation-start point in the first working area from the second operation-end point in the second working area, the return route including a shortest route from the second operation-end point to the second operation-start point, a route reverse to the generated interregional flight route from the first working area to the second working area, and a shortest route from the first operation-end point to the first operation-start point.

10. The flight route generation device according to claim 9, wherein the at least one processor is configured to execute the instructions to:

generate, in each of the plurality of working areas, the return route which is different from a route reverse to the intraregional flight route.

11. The flight route generation device according to claim 1, wherein the at least one processor is configured to execute the instructions to:

generate a return route, different from the generated interregional flight route, for the flight vehicle to return to the first working area from the second working area passing via the at least one via-point.

12. A flight route generation method comprising:

acquiring working-area information for designating a plurality of working areas intended for a plurality of operations to be performed by a flight vehicle during a flight of the flight vehicle and via-point information representing a position of at least one via-point, identified by a user, which the flight vehicle passes through when flying over the plurality of working areas;

generating a plurality of intraregional flight routes for the flight vehicle to fly through the plurality of working areas based on the working-area information;

generating an interregional flight route, passing via the at least one via-point, for the flight vehicle to move from a first working area to a second working area based on the via-point information;

acquiring, when the flight vehicle moves between the first working area and the second working area among the plurality of working areas, first information, identified by the user, representing a first operation-start point for starting a first operation and a first operation-end point, which indicates a different position from the first operation-start point, for finishing the first operation in the first working area and second information, identified by the user, representing a second operation-start point for starting a second operation and a second operation-end point, which indicates a different position from the second operation-start point, for finishing the second operation in the second working area; and generating the interregional flight route from the first operation-end point in the first working area to the second operation-start point in the second working area, which is different from the first working area.

13. A non-transitory computer-readable storage medium having a stored program causing a computer to implement a process, the process comprising:

acquiring working-area information for designating a plurality of working areas intended for a plurality of operations to be performed by a flight vehicle during a flight of the flight vehicle and via-point information representing a position of at least one via-point, identified by a user, which the flight vehicle passes through when flying over the plurality of working areas;

generating a plurality of intraregional flight routes for the flight vehicle to fly through the plurality of working areas based on the working-area information;

generating an interregional flight route, passing via the at least one via-point, for the flight vehicle to move from a first working area to a second working area based on the via-point information;

acquiring, when the flight vehicle moves between the first working area and the second working area among the plurality of working areas, first information, identified by the user, representing a first operation-start point for starting a first operation and a first operation-end point, which indicates a different position from the first operation-start point, for finishing the first operation in the first working area and second information, identified by the user, representing a second operation-start point for starting a second operation and a second operation-end point, which indicates a different position from the second operation-start point, for finishing the second operation in the second working area; and generating the interregional flight route from the first operation-end point in the first working area to the second operation-start point in the second working area, which is different from the first working area.

* * * * *